United States Patent [19]
Burt et al.

[11] Patent Number: 5,071,333
[45] Date of Patent: Dec. 10, 1991

[54] APPARATUS FOR FORMING A POWDER METAL MIRROR

[75] Inventors: Donald W. Burt, Manhattan Beach; Gerald A. Hans, Woodland Hills, both of Calif.

[73] Assignee: Hughes Aircraft Company, Los Angeles, Calif.

[21] Appl. No.: 438,915

[22] Filed: Nov. 17, 1989

Related U.S. Application Data

[62] Division of Ser. No. 223,982, Jul. 25, 1988, Pat. No. 4,898,711.

[51] Int. Cl.⁵ .............................................. B22F 3/16
[52] U.S. Cl. .................................... 425/78; 425/356; 425/398; 425/412
[58] Field of Search .................................... 419/26–29, 419/38; 425/78, 398, 412, 415, 416, 423, 426, 400, 340, 346, 356

[56] References Cited

U.S. PATENT DOCUMENTS

| | | | |
|---|---|---|---|
| 2,540,457 | 2/1951 | Rice | 419/28 |
| 2,869,947 | 1/1959 | Kemper | 425/78 |
| 3,069,757 | 12/1962 | Beggs et al. | 419/27 |
| 3,807,913 | 4/1974 | Brede et al. | 425/78 |
| 4,251,273 | 2/1981 | Smith et al. | 419/28 |
| 4,408,833 | 10/1983 | Gowan | 264/332 |
| 4,419,413 | 12/1983 | Ebihara | 425/78 |
| 4,492,669 | 1/1985 | Gould | 249/177 |
| 4,659,548 | 4/1987 | Gubbay et al. | 419/27 |
| 4,793,953 | 12/1988 | Maus | 425/808 |

Primary Examiner—Jay H. Woo
Assistant Examiner—James P. Mackey
Attorney, Agent, or Firm—R. M. Heald; C. D. Brown; W. K. Denson-Low

[57] ABSTRACT

A mirror having optical quality reflective faces is prepared by pressing of metallurgical powders. An optical quality surface, free of scratches and irregularities, is formed by pressing the faces with an optical quality tool face, applied to the face at an acute angle to achieve a degree of metal flow. The mirror is progressively formed, by first pressing an assembly of powder to a "green" powder mirror, sintering the pressed powder, and then repressing the sintered mirror using a tool having optical quality surfaces on the faces contacting the mirror faces. The mirror is annealed, repressed with the tool having optical quality surfaces, and coated on the reflective surfaces with a thin metallic coating. This technique is particularly effective for preparing large numbers of mirrors with multiple facets requiring precise facet intersections, as the pressing tool can be adjusted to produce highly exact facet intersections which are then reproduced exactly in subsequent mirrors.

6 Claims, 3 Drawing Sheets

APPARATUS FOR FORMING A POWDER METAL MIRROR

This is a division of application Ser. No. 223,982, filed July 25, 1988 and issued Feb. 6, 1990 as U.S. Pat. No. 4,898,711.

BACKGROUND OF THE INVENTION

This invention relates to the production of mirrors, and, more particularly, to a powder metallurgical technique for manufacturing large numbers of mirrors having multiple reflective surfaces.

Common plate glass mirrors are found in nearly all homes, and are familiar to most persons. To prepare such mirrors, a very smooth glass surface is formed, and then a reflective coating is deposited over the smooth glass surface. The reflective coating is instrumental in achieving a high degree of reflectance, but the glass surface itself must be smooth so that the image is not distorted and possibly lost in part because of stray reflections. The preparation of glass mirrors benefits greatly from the availability of a process for making very smooth glass surfaces, and the design of the mirror in which there is only one reflecting surface.

Other types of mirrors are prepared in a similar fashion, wherein a very smooth surface is coated with a reflecting coating. In some instances, the preparation of smooth, optical quality reflective surfaces is quite difficult, and presents a major obstacle to the manufacturing of the mirror. Once the reflective surfaces are prepared, coating is relatively simple.

To cite a particular example of interest, rotating mirrors are used in some types of imaging systems. Such mirrors are toroids, or donut shaped, with a large number of either inwardly or outwardly facing reflective faces positioned on the inside or outside of the donut, respectively. The reflective faces are positioned at a variety of angles to reflect only one portion of an image to a detector at any moment. As the mirror rotates about the toroid axis, the reflective faces serially decompose the image so that it can be serially analyzed by the detector, transmitted electronically, signal processed, and finally reconstructed elsewhere if necessary.

In one increasingly familiar example, some laser bar code reading systems in supermarkets employ a rotating toroidal mirror having a large number of outwardly facing reflective facets. The facets are typically flat surfaces that are intentionally oriented between 6 and 18 degrees from the toroid axis. Light from an image is decomposed by the mirror and transmitted to a sensor, which reads the bar codes. This type of system is required because the bar codes may be presented at any angle and may be misoriented.

For many applications, such multifaceted mirrors must be made of metal, rather than glass. The mirror may be spun about its axis at a rate of up to 3600 revolutions per minute, requiring high strength and resistance to failure. Glass is too unreliable a material of construction for such a use. Making the mirror of metal permits it to be balanced readily, an important requirement when the mirror is to be spun rapidly. Moreover, no method of fabrication is now known to make such mirrors of glass in a highly precise toroidal form with a large number of internal facets, and with high perfection at the intersection lines of the facets.

Multifaceted metal mirrors have in the past been manufactured by one of two methods. In one, a metallic structure of the correct shape is machined, and a number of separately prepared glass mirrors are bonded to the prepared metal surfaces. The mirrors produced by this approach are unreliable, because of the possibility of failure of the glass or the bond between the metal and the glass, particularly during temperature excursions. The success rate of preparation is small, typically producing 1 good toroidal mirror for each 50 attempted, because much of the mirror preparation is a handwork process that depends upon the skill and patience of the assembler. Such mirrors are therefore very expensive.

In another approach, the mirror is made entirely out of metal. The all-metal mirror is fabricated by first machining the general shape of the mirror, including the mirror facets, from metal bar stock. The facets are fine machined using diamond cutting tools in precision machinery that is mounted on granite bases and operated in a temperature-controlled environment. The final machining is accomplished on each of the mirror facets, with the intent that each facet be an optical quality surface with no scratches or irregularities. The machined facet surfaces are finally coated with gold or a similar metallic coating.

As may be appreciated, this machining approach is slow, and utilizes expensive machinery. The quality of the finished mirrors is sometimes low, unless extreme care and time are taken. Low mirror quality typically results from one of two sources. First, the optical-quality machining of a mirror facet may leave fine scratches, due to machinery irregularities or because of metallurgical irregularities in the metal being machined. Second, even if the mirror faces themselves are optical quality, the intersections between the facets may have irregularities. The intersection line of two facets is the line along which the two planar faces join. When using machine tools, it is difficult to maintain this intersection line perfectly straight, and without irregularities. Imperfections result in a scattering of light at the intersection lines termed stray light radiation. Such stray light effects significantly degrade the image quality of the decomposed, or decomposed and reconstructed, image. By the nature of machining operations, even those where care is taken, the optical quality machining of each intersection presents a new opportunity for creation of an imperfection. That is, machining operations are inherently of low reproducibility, where an extremely high degree of perfection is required. As a result of these various problems, for many manufacturers the success rate for production of such high-quality rotating metal mirrors is about 1 acceptable mirror for each 10 attempted. The cost of the mirrors is therefore high.

There therefore exists a need for a process of manufacturing multifaceted, all-metal mirrors having a number of optical quality reflective surfaces, and the mirrors made thereby. The process should produce mirrors of high quality with low cost. The present invention fulfills this need, and further provides related advantages.

SUMMARY OF THE INVENTION

The present invention provides metallic mirrors having at least one optical quality reflective surface, and a process for their fabrication. Most preferably, the mirrors have multiple reflective surfaces and associated lines of intersection. The process is particularly suited to producing large numbers of such mirrors on a production basis, so that the mirrors are reproducibly of a high degree of perfection. The method is economical, in that it does not utilize expensive diamond machining tools and has a high success rate in making the mirrors. The mirrors themselves are of superior quality to those made from bar stock, in that their internal uniformity is higher and the metallurgical structure and composition are more easily controlled. Stray light radiation associated with production mirrors of the invention is consistently less than observed for machined mirrors.

In accordance with the invention, a process for forming a mirror having a mirror face with an optically smooth surface thereupon comprises the steps of providing a consolidated powder material mirror intermediate precursor; and pressing the intermediate precursor with a tool in a manner such that the portion of the tool contacting the mirror face moves at an acute angle to the optical face, the portion of the tool contacting the mirror face having an optical quality finish.

The mirror is produced from powdered metals that are pressed into the rough shape of the finished mirror and then sintered to form an intermediate precursor of the mirror. The starting powder is preferably a mixture of copper and a binder powder such as kovar. The intermediate precursor is about the size and shape of the finished mirror, with rough faces positioned where the reflecting faces are located in the final mirror. The optical quality reflecting surfaces are produced by pressing another tool, having optical quality faces conforming to the reflective surfaces, against the rough faces at an acute angle, which is preferably less than about 20 degrees. The mirror faces produced by this angular pressing technique are of optical reflective quality.

There are typically multiple pressings and intermediate annealing used in forming the finished mirror, so that the final mirror is progressively formed from powder to its final shape and surface quality. However, no machining of the reflective surfaces is required (although unrelated machining of attachment supports and the like, separated from the reflective surfaces, can be performed). A great virtue of the process is therefore manufacturing reproducibility and reduced cost, even where there are multiple reflective mirror faces on the mirror. Once a group of pressing tools is fabricated and adjusted to achieve properly oriented, optical quality reflective surfaces and precisely perfect facet intersection lines, then large numbers of substantially identical mirrors may be fabricated using this tooling until it wears out. Because the mirrors are made of powdered metals, their internal structure is uniform throughout, improving their stability during rotation as compared with mirrors machined from bar stock.

After the mirrors are fabricated, the reflective surfaces are coated with a metal such as gold, to improve the reflectivity and prevent degradation of the surfaces. It must be emphasized that the reflective metal coating cannot entirely compensate for imperfections that might be present in the faces prior to coating. That is, if waviness or scratches are present on the reflective surface before coating, they will ordinarily be present after coating. The reflective surfaces of the mirror must therefore be of optical quality prior to the commencement of the coating operation.

In accordance with a preferred aspect of the invention, a process for preparing, from metallurgical powders, a mirror having at least one mirror face with an optical quality reflective surface thereon comprises the steps of forming from metallurgical powders a first precursor of a final mirror, the first precursor being powder in a form having the general shape of the final mirror but being larger in size than the final mirror; pressing the first precursor with a tool to consolidate the powder material and to define the mirror face, thereby forming a first intermediate precursor of the mirror; sintering the first intermediate precursor to form a second intermediate precursor; repressing the second intermediate precursor to form a third intermediate precursor, in a first repressing step, with a tool having an optical quality tool face contacting the mirror face, the tool face that contacts the mirror face moving at an acute angle relative to the mirror face; annealing the third intermediate precursor; repressing the annealed third intermediate precursor, in a second repressing step, with a tool having an optical quality tool face contacting the mirror face, the tool face moving at an acute angle relative to the mirror face; and coating the mirror face of the repressed third intermediate precursor with a metallic coating. The process is most effectively used when there are several mirror faces, so that all of the faces are produced simultaneously as the preceding steps are applied. Toroidal mirrors with more than 20 inwardly directed reflective faces, and having numerous facet intersection lines, have been reproducibly prepared by this approach.

In accordance with this processing aspect of the invention, a process for preparing, from metallurgical powders, a toroidal mirror having a plurality of inwardly directed mirror faces with an optical quality reflective surface thereon, the faces being angularly oriented with respect to the toroidal axis by up to about 20 degrees, comprises the steps of forming from metallurgical powders a first precursor of a final mirror, the first precursor being powder in a form having a toroidal shape which is larger in size than the final mirror; pressing the first precursor against a first outer wall die with a tool moving parallel to the toroidal axis down the center of the toroid, to consolidate the powder material and to define the mirror faces, thereby forming a first intermediate precursor of the mirror of a size larger than the final mirror, the tool having face portions angularly oriented with respect to the toroidal axis by up to about 20 degrees and conforming to the positions of the mirror faces of the final mirror; sintering the first intermediate precursor to form a second intermediate precursor; repressing the second intermediate precursor against a second outer wall die to form a third intermediate precursor, in a first repressing step, with a tool moving parallel to the toroidal axis down the center of the toroid, the tool having face portions angularly oriented with respect to the toroidal axis by up to about 20 degrees and conforming to the positions of the mirror faces of the final mirror; annealing the third intermediate precursor; repressing the annealed third intermediate precursor against the second outer wall die, in a second repressing step, with a tool moving parallel to the toroidal axis down the center of the toroid, the tool having face portions angularly oriented with respect to the toroidal axis by up to about 20 degrees and conforming to the positions of the mirror faces of the final mirror; and coating the mirror face of the repressed third intermediate precursor with a metallic coating.

The mirrors made by the process of the invention are unique, having properties that cannot be achieved by any other known production process. The powder metallurgical microstructure is homogeneous and controllable to a greater extent than is the structure of mirrors made from bar stock, as bar stock is normally somewhat inhomogeneous from center to edge and around the periphery. The pressed powder mirror is structurally uniform, so that the mirror is more uniform, an important advantage, especially for rotating mirrors. The mirror faces are more perfect than typically available from machining operations, and can be regularly obtained in this highly perfect condition. The facet intersections are also more perfect than possible with machined mirrors, reducing stray light radiation problems.

In accordance with this aspect of the invention, a mirror comprises a mirror face having an optical quality reflective surface, and a supporting structure, the mirror face and supporting structure being formed of a sintered powder material; and a reflective coating on the optical quality reflective surface.

As discussed previously, the present invention is of immediate interest in the fabrication of toroidal mirrors. In this aspect of the invention, a toroidal mirror having a plurality of inwardly facing reflective faces comprises a toroidal body having a microstructure characteristic of a sintered powder metallurgical structure; a plurality of inwardly facing reflective faces on said toroidal body and integral therewith, the faces having optical quality reflective surfaces, the faces being oriented from the toroidal axis by up to about 20 degrees; and a reflective coating on the optical quality reflective faces.

Apparatus for forming mirrors by the previously described process is also within the scope of the invention. In accordance with the invention, apparatus for progressively forming a mirror having at least a first mirror face thereon, the first mirror face having an optical quality reflective surface, comprises powder container means for containing a quantity of metal powder in a first precursor form of a final mirror; a first pressing tool having a pressing surface conforming to an intermediate precursor of the final mirror, the intermediate precursor being similar in shape to the final mirror but larger in size to account for powder shrinkage upon sintering, said first pressing tool having at least a first die face conforming to the location of the first mirror face; a second pressing tool having a pressing surface conforming to the shape of the final mirror, said second pressing tool having at least a first final die face having an optical quality finish conforming to the first mirror face; and means for pressing said second pressing tool against said intermediate precursor so that said first final die face is forced against the first mirror face at an acute angle, thereby forming an optical quality surface on the first mirror face. This apparatus is adaptable to the formation of mirrors with multiple facets and toroidal mirrors, as described previously.

It will now be appreciated that the process, mirrors, and apparatus of the invention provide an important advance in the art of manufacturing mirrors. These advantages are most acutely realized in the mass production of large numbers of mirrors having multiple reflecting faces, and where the reflecting faces are joined along intersections that must be reproducibly perfect. Fabrication of the mirrors from metallurgical powders also contributes to their uniformity in structure and mode of manufacture. The mirrors can be made to be uniformly of high quality, at significantly reduced costs as compared with alternative methods. When in a toroidal form, such mirrors are particularly useful in applications where they are rotated to decompose images, as in infrared imagers and laser bar code readers. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2 is a series of detail views of FIG. 1, wherein

DETAILED DESCRIPTION OF THE PREFERRED EMBODIMENT

Figure 1:
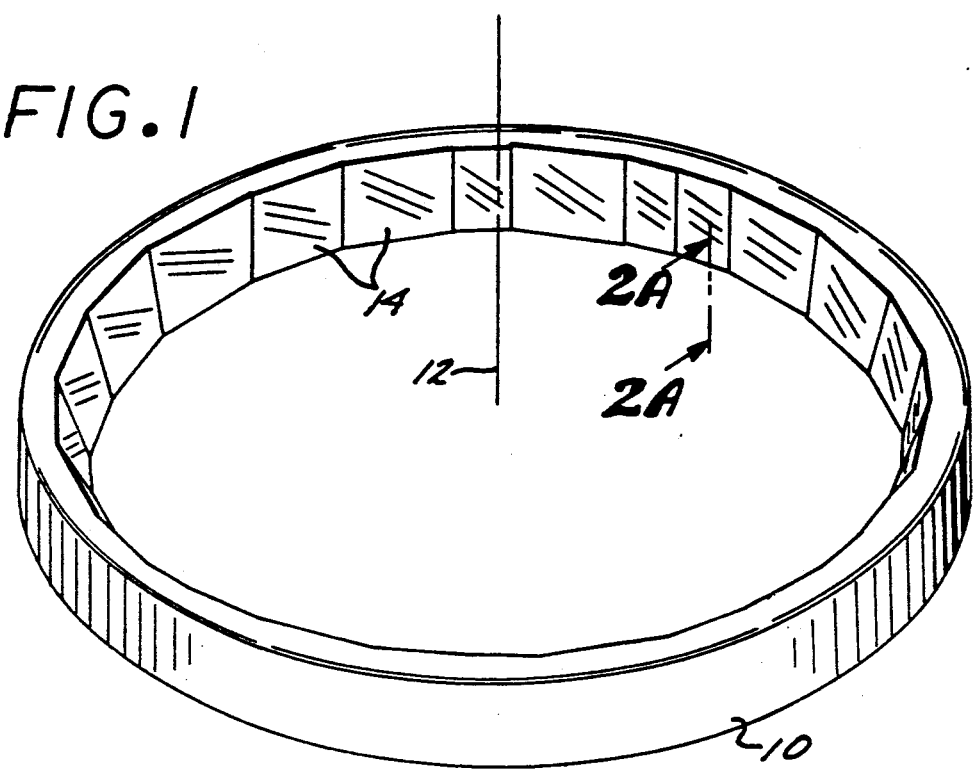
FIG. 1 is a perspective view of an internally faceted toroidal mirror.

The present invention is preferably used in relation to a toroidal mirror 10, illustrated in FIG. 1, a process for preparing such a mirror 10, and apparatus used in preparing the mirror 10. As used herein and as illustrated, the mirror 10 has the general shape of a toroid or donut, and is a geometrical object formed by a closed curve rotating about, but not intersecting or containing, an axis 12 in its own plane. The mirror 10 is internally faceted, having a plurality of planar reflective faces 14 on the inner side of the mirror 10, facing generally inwardly toward the axis 12.

Although the faces 14 generally face inwardly, in the mirror 10 the faces 14 are oriented at a variety of angles with respect to the axis 12. Typically, the angle between the plane of any particular face 14 and the axis 12 is from about 6 to about 18 degrees. The particular angles and relative relationships of the faces with each other are selected to achieve particular objectives in the optical system in which the mirror 10 is used, and their selection and values are not part of the present invention. The present invention is concerned with the fabrication of the mirror 10 to achieve optical quality faces 14 having the selected angle for each face 14 around the circumference of the mirror 10.

To achieve the optical and structural performance required in the mirror 10, the mirror must be structurally sound. The mirror 10 must also be uniform throughout, as it is rotated about the axis 12 at rates as high as 3600 revolutions per minute. Irregularities in density and structure can cause a wobble in the mirror as it rotates. The faces 14 must be of optical quality. As used herein, the term "optical quality" means that the surface or face must have a departure from flatness that does not exceed 8 fringes of visible light over the clear aperture, and not exceed 4 fringes of visible light over any 0.3 inch diameter circle within the clear aperture, when measured with visible monochromatic light. Additionally, there can be no scratches, digs or other cosmetic defects for any individual clear aperture.

Figure 2A:
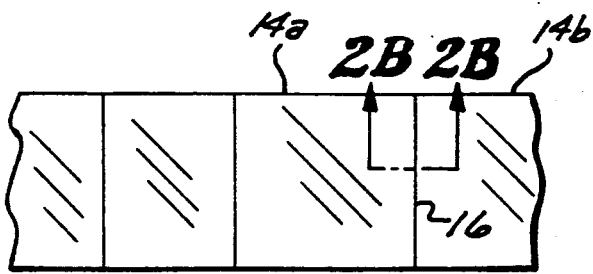
FIG. 2A is a side view of a portion of the mirror viewed from the toroidal axis, taken generally along line 2A—2A of FIG. 1, and FIGS. 2B and 2C are axial views of facet intersections, taken generally along line 2B—2B of FIG. 2A.
Figure 2B:
Figure 2C:
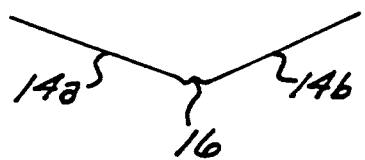

Another important requirement is that two adjacent faces 14a and 14b, illustrated in FIG. 2, must contact each other along a smooth, regular line of intersection 16. FIG. 2B illustrates in side view a line of intersection 16 where the faces 14a and 14b remain planar to the very line of intersection, and there are no irregularities along the line of intersection. By contrast and as illustrated in FIG. 2C, the faces 14 can be curved adjacent the line of intersection 16, and there can be irregularities along the line of intersection. The types of nonplanarity and irregularities illustrated in FIG. 2C, where present, have major adverse influences upon the performance of the mirror, generally termed stray light radiation. Such influence arises due to the trapping of light at the irregularities and possible bright flashes of light at the corners that tend to focus an improperly high or low light intensity upon a detector. The optical noise so produced can, for example, overwhelm a sensitive detector so that meaningful information cannot be collected from the reflected light of either face 14a or 14b.

The most successful prior approach for preparing mirrors of the type of the mirror 10 has been to machine a mirror blank of the general shape of the toroidal mirror from a bar of metal such as a beryllium-copper alloy. The faces are then rough machined by conventional machining, and finish machined with diamond tools in optical machine tools such as heavy milling machines mounted on granite bases in temperature-controlled rooms. The finish machining is intended to produce an optical quality, flat surface on the faces. Even with the exercise of great care, each of the faces and intersections is essentially a one of a kind machining job, as the microstucture of the metal can cause irregularities that interfere with the very fine machining. Even small temperature variations and room vibrations can prevent the exact machining of a perfect line of intersection, FIG. 2B, and result in an imperfect line of intersection, FIG. 2C. There is little control over random occurrences that produce imperfections, with the result that, for many manufacturers of such mirrors, only 1 mirror in 10 meets exacting optical quality standards.

The present invention uses an entirely different approach to achieve improved mirror quality. The mirror 10 is formed from metal powders rather than a piece of bar stock, so that the final mirror is not subject to internal variations due to the metallurgical structure of the bar. The use of powders results in a substantially uniform microstructure of the mirror throughout. Preferably, the mixture of powders includes copper and kovar powders, but there is no known limitation as to the composition and mix of the powders. The copper powder is preferably 99.99 percent purity, and the composition of the kovar powder is 29 percent nickel, 17 percent cobalt, balance iron totalling 100 percent, the percentages being by weight. The copper powder particles are about 6-8 micrometers in diameter, and the kovar powder particles are about 40 to 150 micrometers in diameter. The proportion of the two powders is most preferably about 98 percent by weight copper and 2 percent by weight kovar, but variations are permitted. The copper produces a highly reflective final surface, and the kovar helps to bind the copper and control thermal expansion.

Figure 3:
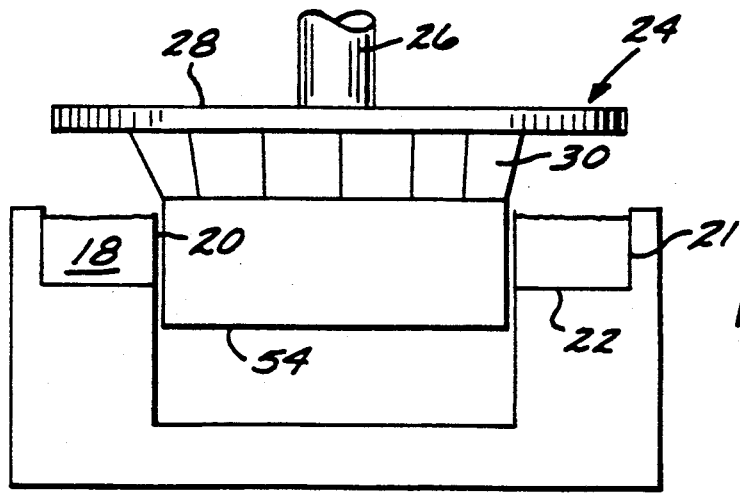
FIG. 3 is a side view of tooling for forming a first intermediate precursor of an internally faceted toroidal mirror, with a portion of the tooling in section.

The tooling and apparatus used to prepare the mirror 10 from powders are illustrated in FIGS. 3-5, and FIG. 6 is a schematic flow chart for the process. The mixture of powders 18 is placed into a form 20 having the general shape of a toroid, termed a first precursor form 21 of the final mirror, as shown in FIGS. 3 and 6A. The form 20 is supported in an outside die 22, whose function is to define an outer shape on the side of the mirror 10 facing away from the axis 12. A first pressing tool 24 is used to define the inner shape of the mirror 10 facing toward the axis 12. The tool 24 includes a steel plunger 26. An enlarged holder 28 is fastened to the end of the plunger 26. The holder 28 supports a plurality of inwardly sloping die faces 30 that are shaped and positioned to conform to the desired shape and positioning of the faces 14, except as will be indicated. A cylindrical base block 54 is positioned below the die faces 30 and supported by the holder 28. The base block aids in alignment of the die faces 30 with the form 20 and the die 22. The die faces 30 are adjustable in relation to the holder 28 with screw adjustments, and can be moved to ensure that the lines of intersection 16 are perfectly formed.

The tool 24 is supported in a frame 32, by supporting the plunger from a hydraulic cylinder 34 joined to the frame 32, forming an apparatus 36 for progressively forming the mirror 10. The tool 24 is forced downwardly along the axis 12 on the inside of the form 20. The die faces 30 contact the inner wall of the form 20, and crush it outwardly so that the powder 18 is compacted outwardly against the outer die 22. A pressure of about 15 metric tons per square inch is applied to the powder mass, which is sufficient to compact it into an adherent state known as a "green" state, having the shape of a first intermediate precursor 38 of the final mirror, FIG. 6B. The green powder piece can be carefully handled manually. The first intermediate precursor 38 is generally toroidal in shape like the mirror and has defined faces corresponding to the die faces 30. The first intermediate precursor 38 differs from the final mirror 10 in two important respects. First, the precursor 38 is larger than the mirror 10, to account for sintering shrinkage, and second, the surfaces of the faces 14 are not of optical quality.

The first intermediate precursor 38 is sintered to further consolidate and bond the powders into a unitary metallurgical structure. Sintering is accomplished by heating the precursor 38 to a temperature and for a time sufficient to achieve consolidation and bonding of the powders, preferably about 1760° F. in an atmosphere of 25 percent by volume hydrogen and 75 percent by volume nitrogen gas, for a period of about 2 hours in the case of the preferred embodiment. The powders consolidate to nearly 100 percent density, and the precursor 38 shrinks as the powders consolidate, to form a second intermediate precursor 40, FIG. 6C. The amount of shrinkage upon sintering may be determined empirically or predicted mathematically.

Figure 4:
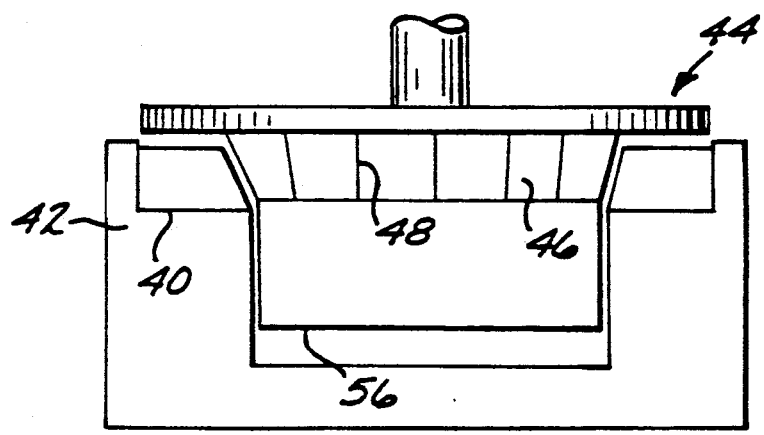
FIG. 4 is a side view of tooling for forming a third intermediate precursor of an internally faceted toroidal mirror and the final mirror, with a portion of the tooling in section.
Figure 5:
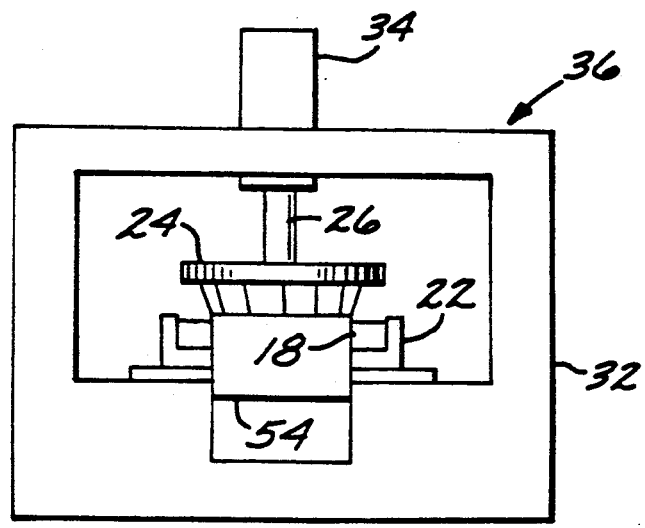
FIG. 5 is an apparatus for forming an internally faceted toroidal mirror by the process of the invention.
Figure 6:
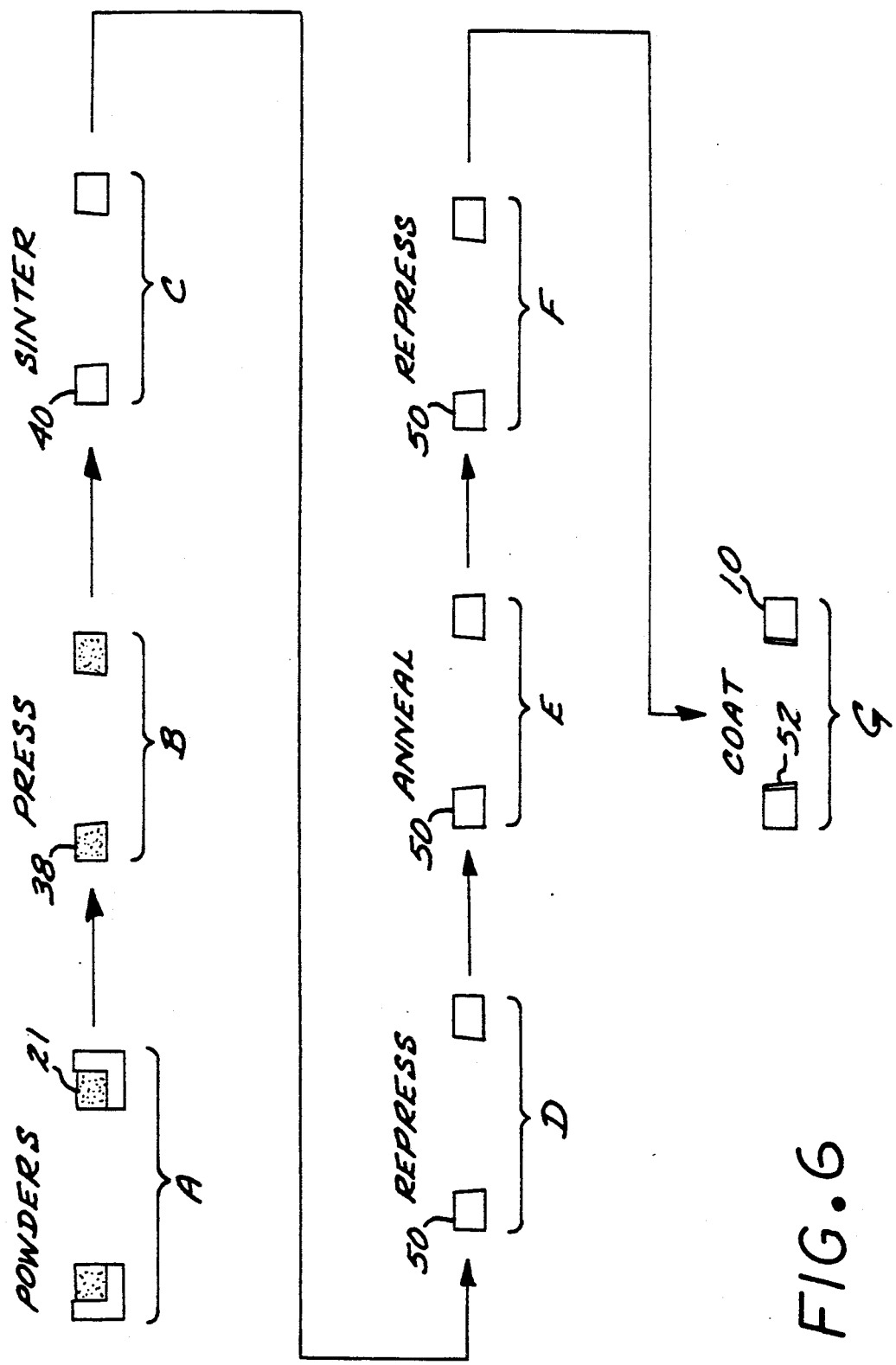
FIG. 6 is a schematic process flow chart for fabricating an internally faceted toroidal mirror, illustrating the form of the mirror at various stages of processing.

The sintered second intermediate precursor 40 is repressed in a first repressing step, FIG. 6D, using an arrangement somewhat similar to that discussed in relation to FIG. 3. As shown in FIG. 4, the second intermediate precursor 40 is placed into an outer die 42 having substantially the size of the outer surface of the mirror 10. A second pressing tool 44 is pressed into the center of the precursor 40, along the axis 12, and is guided by a base block 56. The pressing is accomplished in the apparatus 36, in the same general manner as was the pressing operation involving the first pressing tool 24. The second pressing tool 44 has substantially the same configuration as the inwardly facing portion of the mirror 10, including second die faces 46 that conform to and form the faces 14 of the mirror 10.

The second die faces 46 have optical quality surfaces. Adjacent die faces 46 are carefully arranged and adjusted so that the intersection lines 48 between the die faces 46 are smooth and regular, with no nonplanarity adjacent the intersection lines 48. The die faces 46 and intersection lines 48 are reproduced in the inner wall as the second intermediate precursor 40 is pressed, so that its shape is slightly changed to form a third intermediate precursor 50.

The use of optical quality die faces 46 and the pressing of the die faces 46 into the inside wall at an acute angle, preferably 20 degrees or less, rather than a right angle, imparts an optical quality surface finish to the faces 14. While the exact mechanism is not known with certainty, it is believed that the shearing movement of the die faces against the mirror faces reduces irregularities on the mirror faces with a polishing and deforming action. Since the optical quality die faces 46 are themselves of a high degree of perfection, their movement tends to reduce irregularities on the mirror faces 14. Some of the most common types of irregularities on the die faces 46, such as scratches, are not reproduced into the mirror faces 14 because of the shearing. The mirror faces 14 can therefore have an even greater degree of perfection than the die faces 46 from which they are formed. Additionally, the lines of intersection 16 are highly perfect, as shown in FIG. 2B, due to the shearing action.

The third intermediate precursor 50 is annealed to remove bulk and surface stresses caused in the first repressing, FIG. 6E. The preferred annealing treatment is at 1100° F. for 2 hours in a nitrogen atmosphere.

The annealed third intermediate precursor 50 is repressed in a second repressing, FIG. 2F, using the same approach as described previously in relation to the first repressing. The same second pressing tool 44 is used, with the same processing procedures. Normally, the second repressing causes very little metal flow of the precursor 50, and there is little shape change. The second repressing removes any irregularities produced as a result of strain relaxation during the annealing step. The second repressing also gives a final polishing and oxide removal to the faces 14.

The progressive forming operation is complete, with the mirror 10 in its final toroidal shape and the faces 14 having optical quality reflecting surfaces. The faces 14 are then preferably coated with a coating 52 of a reflective material such as gold. The gold coating 52 enhances the optical finish of the faces 52. The gold coating cannot, however, impart an optical finish to the faces 52 and produce high quality lines of intersection 16, if these qualities are not present in the uncoated mirror. An optical-quality, scratch free surface on the faces 52 and a straight, sharp, and regular line of intersection 16 result only from the metal forming operation, not the coating step.

The internally faceted, toroidal mirror of the invention is produced at a cost of about 1/5 that of the prior machining approach, and the cost of the final coated mirror is about ¼ of that using the prior approach. It is estimated that the tooling used to produce the toroidal mirror has a life of about 200,000 mirrors, so that the one-time tooling cost is amortized over a large number of mirrors produced. After the tooling is adjusted to achieve high quality mirrors, each succeeding mirror is substantially identical to prior mirrors in microstructure, shape, and quality. The element of uncontrollability arising during the prior machining process is eliminated, and the large, complex machine tools are not needed. The quality of the mirrors is uniformly excellent, in structure and balance, strength, optical quality of the faces, and optical quality of the lines of intersection.

Although particular embodiments of the invention have been described in detail for purposes of illustration, various modifications may be made without departing form the spirit and scope of the invention. Accordingly, the invention is not to be limited except as by the appended claims.

What is claimed is:

1. Apparatus for repeatedly compressing a quantity of metallic powder to directly form a final mirror having at least one optical quality reflective surface, comprising:

a stationary container assembly capable of supporting a quantity of metallic powder in an initial precursor of said final mirror;

a first tool initially movable toward said stationary container assembly, said first tool including die face means for compressing said metallic powder against said stationary container assembly, thereby forming an intermediate precursor of said final mirror;

a second tool movable toward said stationary container assembly, said second tool including optical quality die face means for further compressing said intermediate precursor against said stationary container assembly, thereby forming a configuration of said final mirror; and means for directing said optical quality die face means at an acute angle relative to a confronting face of said intermediate precursor, whereby said optical quality die face means contact and shear said confronting face to form at least one optical quality reflective surface directly on said final mirror.

2. The apparatus according to claim 1, wherein said die face means of said first tool and said optical quality die face means of said second tool each include a single die face.

3. The apparatus according to claim 1, wherein said die face means comprises a plurality of separate die faces joined to one another along smooth, straight lines of intersection.

4. The apparatus according to claim 3, wherein said optical quality die face means comprises a plurality of separate die faces joined to one another along smooth, straight lines of intersection, wherein each die face of said optical quality die face means has an optical quality finish and interacts with a separate face of said intermediate precursor to form a plurality of separate, optical quality reflective surfaces directly on said final mirror.

5. The apparatus according to claim 4, wherein said plurality of joined die faces of each of said die face means and said optical quality die face means form a substantially toroid-shaped die assembly.

6. The apparatus according to claim 1, wherein said stationary container assembly includes an initial form capable of supporting said initial precursor and a separate, final form capable of supporting said intermediate precursor and said final mirror.

* * * * *